United States Patent

[11] 3,617,333

| [72] | Inventor | Pervis Brown |
| | | St. Louis, Mo. |
| [21] | Appl. No. | 771,978 |
| [22] | Filed | Oct. 30, 1968 |
| [45] | Patented | Nov. 2, 1971 |
| [73] | Assignee | General Steel Industries, Inc. |
| | | St. Louis, Mo. |

[54] PROCESS FOR FLOTATION TREATMENT OF GLASS BEADS
10 Claims, No Drawings

[52] U.S. Cl. .................................................. 117/35 R,
117/27, 117/100 S, 117/124 T, 117/159, 95/1.5,
350/105, 161/168, 161/192
[51] Int. Cl. ....................................................... C03c 17/28,
C03c 17/22
[50] Field of Search .......................................... 117/27,
100, 35, 159, 124, 429.5; 94/27, 1.5; 260/429.5;
161/192

[56] References Cited
UNITED STATES PATENTS

| 3,222,204 | 12/1965 | Weber et al. ................. | 117/27 |
| 3,244,639 | 4/1966 | Mindick et al. ................ | 117/100 X |
| 3,252,376 | 5/1966 | De Vries ....................... | 88/82 |

Primary Examiner—Alfred L. Leavitt
Assistant Examiner—Edward G. Whitby
Attorney—Rogers, Ezell, Eilers & Robbins ABSTRACT: A process for surface treating or sizing glass beads and similar discrete particles such as silicon carbide, sand and the like, with a chemical adhesion promoter to provide the glass beads with water repellent and organic solvent repellent properties. The surface treatment improves adhesion of the bead to the substrate in which it is embedded, which may be paint or various types of organic binders. Because of the hydrophobic and oleophobic properties provided through repellent surface treatment, the beads do not sink through the binder but rather are floated thereon, and the top surfaces are exposed to provide for reflex-reflective properties. The surface treating or sizing agent is an organo-titanium derivative, including alkyl-titanates, titanium-acylates, and titanium-chelates, in which between two and four of the coordination positions of the titanium are occupied by alkyl or aromatic groups.

PROCESS FOR FLOTATION TREATMENT OF GLASS BEADS

SUMMARY OF THE INVENTION

One of the major problems in the glass bead industry has been to provide a means for full utilization of glass beads while not seriously detracting from their reflective properties. In the manufacture of reflex-reflective signs and sheetings using glass beads, problems have been presented in the past in maintaining strict control of binder thickness so as not to cover the top of the glass beads, and thereby impair the reflex-reflective properties of the bead. An additional problem has been to maintain close size gradation of the beads used because a binder thick enough to furnish a reflective background for a specific size of bead will drown a smaller bead and thereby impair the reflex-reflective properties of the smaller beads. On the other hand, beads that are larger than the specifically selected size may not sink far enough into the binder to provide for proper adhesion.

Because untreated beads do not float, manufacturers of signs using reflective glass beads have tried to use binders which are partially cured to prevent the beads from sinking too far into the binder. This has presented problems because the partially cured binder provides poor adhesion to the glass beads after the binder is finally cured and the beads fall off the binder.

Attempts have been made to provide flotation sizing agents for beads to be used in liquid binders by the utilization of fluorocarbon chemicals to provide a coating on beads which have a low surface energy and, therefore, due to surface tension forces the beads to float on various organic binders as described in Weber and Tomlinson U.S. Pat. No. 3,222,204, patented Dec. 7, 1965. Fluorocarbon chemicals of this type however, have inherent defects in that they form toxic breakdown products when exposed to moderate temperatures, such as may be reached in curing ovens for the binders, presenting a health hazard. Further, the fluorocarbon chemicals are highly inert at room temperature and are often harmful to the strength of the bond between the beads and the binder. Fluorocarbon agents are well-known for providing nonsticking surfaces and are used as mold releases and the like for this purpose.

By means of this invention there has been provided a treatment for glass beads to provide a surface coating which is both oleophobic and hydrophobic, and not harmful either to health or to good bonding performance. The surface treatment provides a bead which floats on the binder previous to solidification of the binder and yields a more efficiently reflex-reflective product. The treatment is obtained by the application of organo-titanium derivatives to the surface of the glass beads. Although speaking in this application of glass beads, it will be understood that other discrete particles such as silicon carbide and sand, and similar particles including glass fibers, may be similarly treated.

Accordingly, an object of this invention is to provide a surface treated glass bead or other discrete material, such as silicon carbide or sand or glass fiber particles, to provide for water repellency, oil repellency, and good adhesion to paints, lacquers, varnishes, films, plastics, and other types of liquid binders, which are capable of being dried to a solid film or coating by the employment of an organo-titanium derivative. X Another object is to provide a nontoxic and inexpensive treatment that will provide for flotation of glass beads and the like at a depth of approximately their radii in liquid binders such as paints, lacquers, varnishes, plastics, and films, and the like, to provide optimum conditions for reflex-reflective properties of the glass beads in the finished product.

The above objects may be obtained by the treatment of glass beads and the like with polymers and/or copolymers of organo-titanium derivatives. The organo-titanium derivatives include, but are not limited to, alkyl-titanates, titanium-acylates, and titanium-chelates, in which between two and four of the coordination positions of the titanium are occupied by alkyl or aromatic groups.

Other objects will appear in the detailed description which follows and will be otherwise apparent to those skilled in the art.

THE DISCLOSURE

Because the organo-titanium derivatives evolve only alcoholic vapors upon reaction, and leave a very thin nearly inert film of titanium polymer on the surface of the materials treated, which for the purpose of example are glass beads, a completely safe process has been provided. The inert film of titanium polymer on the surface of the glass beads remains inert to temperatures normally encountered in manufacturing processes.

Examples of such organo-titanium derivatives are: 3,6 hydroxy tetraoctadecyl titanate; tetraisopropyl titanate, tetraoctadecyl titanate, X 2-ethyl hexyl ortho-titanate, tetramethyl titanate, titanium tetra isopropylate, titanium 2-ethyl 1, 3 hexanediol.

For the purpose of description of this invention, there are set forth below examples typical of the method employed to establish the hydrophobic and oleophobic glass bead surface coatings.

EXAMPLE 1

One hundred grams of glass beads are treated in a mixer with 1 ml. of 1 percent solution of 3, 6 hydroxy tetraoctadecyl titanate in isopropanol. The solvent is allowed to evaporate at room temperature over a period of 5 to 6 minutes. After this evaporation, the glass beads have a surface which is both water repellent and solvent repellent. The glass beads float on the surface of water and oil or water-base paints. If the treated beads are allowed to remain floating on the surface of the medium, whether it be water, organic solvent, or oil or water-base paints, there is no change in repellency until the binder is solidified.

EXAMPLE 2

One ml. of a 1 percent solution of tetraisopropyl titanate in 1.1.1 trichloroethane is applied to 100 grams of glass beads in a mixer. The reaction is initiated by the presence of moisture in the air under ambient conditions. It will be understood that the reaction is accelerated by humid air and takes somewhat longer as the humidity decreases to the low moisture content found in arid regions. The moisture in the air promotes the reaction to cause the formation of isopropanol as a vapor and a thin titanium polymeric film is deposited on the glass bead surface, which is impervious to and insoluble in both water and oil and water-base paints. The treated glass beads float upon the surface of water and oil and water-base paints when applied thereto.

EXAMPLE 3 X

One ml. of a 1 percent solution of 2 ethyl-hexyl ortho-titanate in carbon tetrachloride is applied to 100 grams of glass beads in a mixer and mixed for 5 to 10 minutes. The ortho esters of titanium hydrolyze rapidly upon exposure to water, and thus atmospheric moisture is sufficient to give high molecular weight condensation. After the solvent has evaporated the beads float in xylene and water respectively.

Various changes and modifications may be made within this invention as will be readily apparent to those skilled in the art. Such changes and modifications are within the scope and teaching of this invention as defined by the claims appended hereto.

What is claimed is:

1. A process of applying to glass beads a coating which provide an oleophobic and hydrophobic surface to the glass bead, so that it will float upon a binder; which comprises applying a nontoxic organo-titanium derivative to the glass bead surface, applying the so-treated glass beads to the surface of the liquid binder and forming the binder to a solid coating.

2. The process of claim 1 in which the organo-titanium derivative is selected from at least one member of the group consisting of an alkyl-titanate, a titanium-acylate and a titanium-chelate.

3. The process of claim 1 in which the organo-titanium derivative is an alkyl-titanate.

4. The process of claim 1 in which the organo-titanium derivative is a titanium-acylate.

5. The process of claim 1 in which the organo-titanium derivative is a titanium-chelate.

6. A binder film having bound in the top surface thereof a layer of glass beads, the top surface of said beads being exposed and extending above the film, said glass beads having their surface treated with an organo-titanium derivative to provide hydrophobic and oleophobic surface properties such that the glass bead is floatable upon aqueous and organic binders in the liquid state before the binder is set.

7. The film of claim 6 in which the organo-titanium derivative is selected from at least one member of the group consisting of an alkyl-titanate, a titanium-acylate and a titanium-chelate.

8. The film of claim 6 in which the organo-titanium derivative is an alkyl-titanate.

9. The film of claim 6 in which the organo-titanium derivative is a titanium-acylate.

10. The film of claim 6 in which the organo-titanium derivative is a titanium-chelate.

* * * * *